No. 745,233. PATENTED NOV. 24, 1903.
L. OLIVER.
COMBINED WATER WHEEL AND ELEVATOR.
APPLICATION FILED APR. 25, 1903.
NO MODEL. 4 SHEETS—SHEET 1.

Witnesses
Inventor
Louis Oliver.
By Victor J. Evans
Attorney

No. 745,233. PATENTED NOV. 24, 1903.
L. OLIVER.
COMBINED WATER WHEEL AND ELEVATOR.
APPLICATION FILED APR. 25, 1903.
NO MODEL. 4 SHEETS—SHEET 2.

Witnesses
Chas. S. Hyer.

Inventor
Louis Oliver.
By Victor J. Evans
Attorney

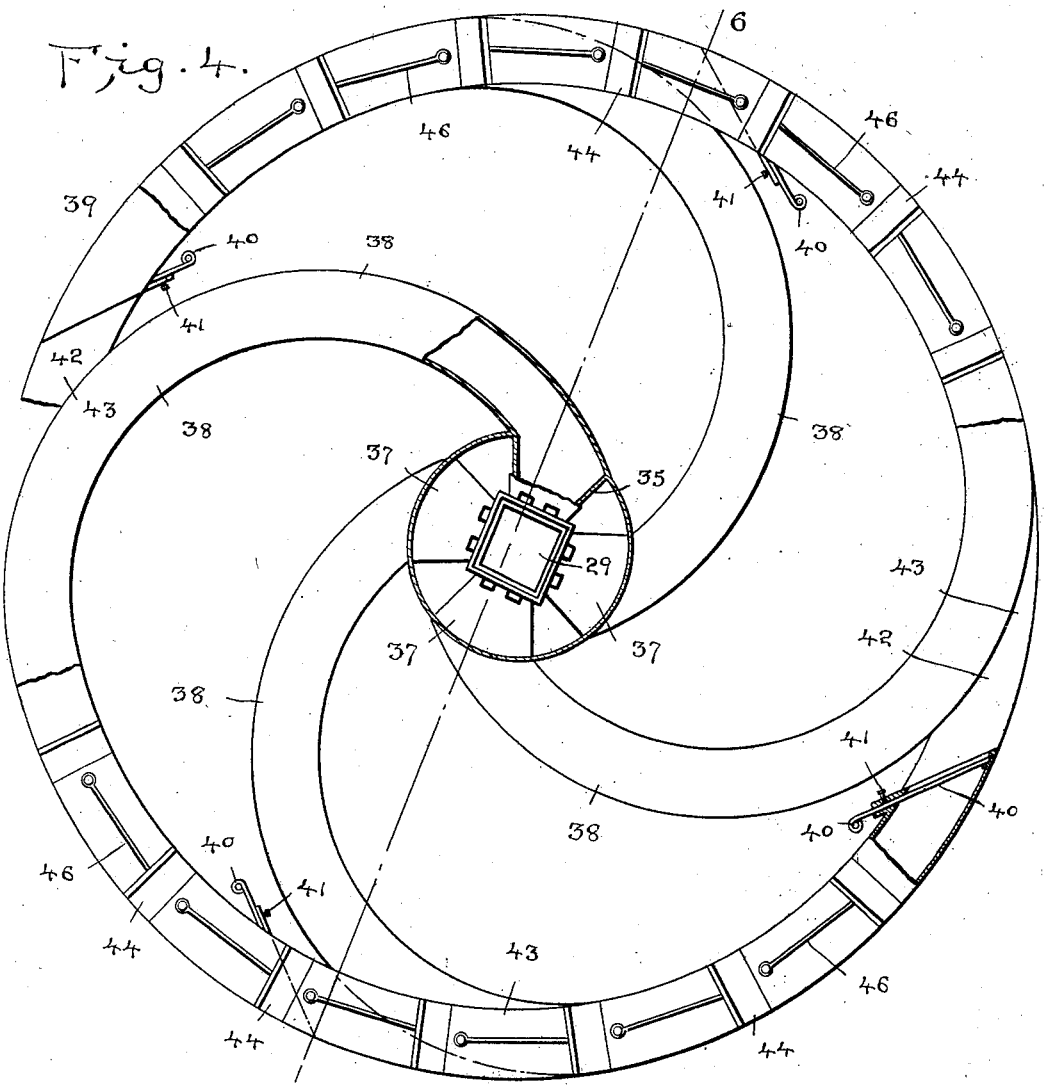
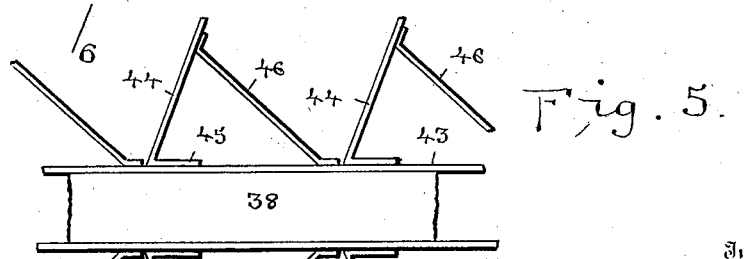

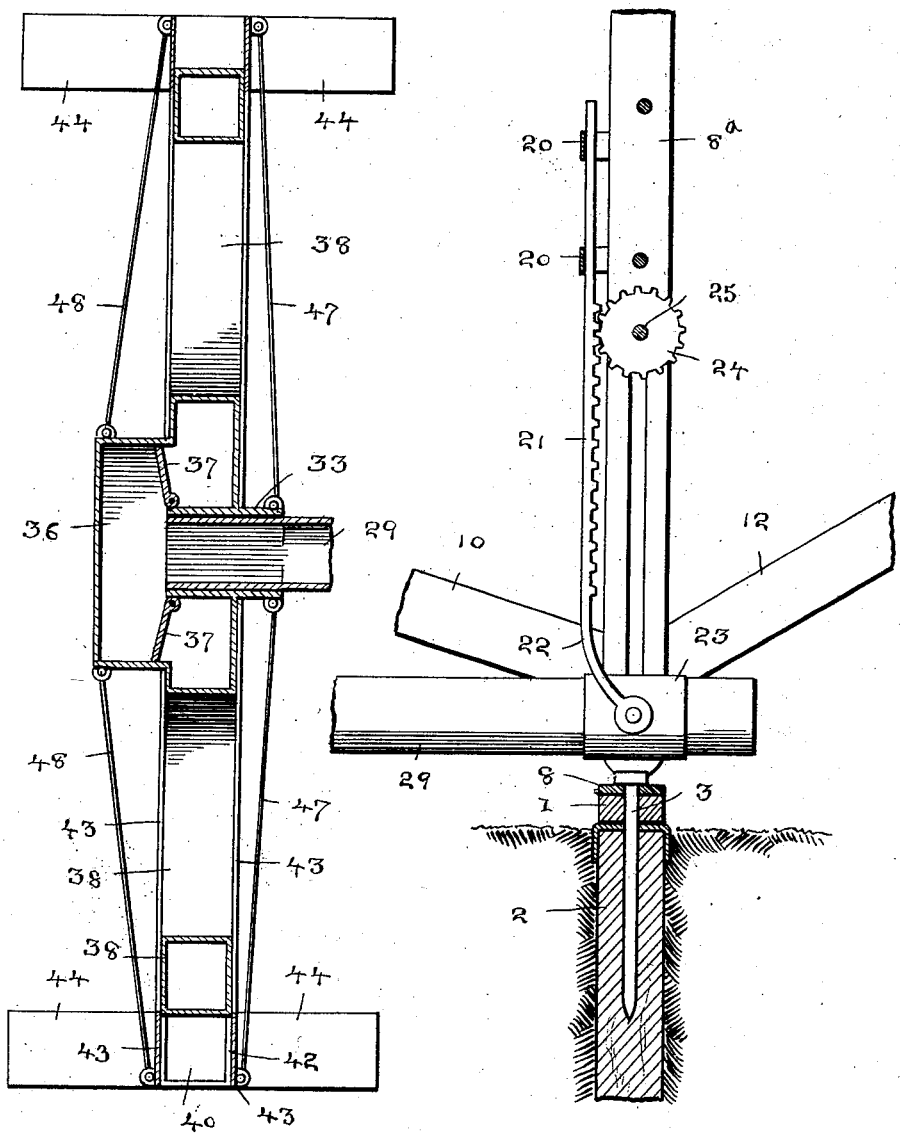

No. 745,233. Patented November 24, 1903.

UNITED STATES PATENT OFFICE.

LOUIS OLIVER, OF ONTARIO, OREGON.

COMBINED WATER WHEEL AND ELEVATOR.

SPECIFICATION forming part of Letters Patent No. 745,233, dated November 24, 1903.

Application filed April 25, 1903. Serial No. 154,325. (No model.)

*To all whom it may concern:*

Be it known that I, LOUIS OLIVER, a citizen of the United States, residing at Ontario, in the county of Malheur and State of Oregon, have invented new and useful Improvements in a Combined Water Wheel and Elevator, of which the following is a specification.

This invention relates to a combined water-elevator and water-wheel; and the primary object of the same is to provide an organization of elements including a rotary water-wheel having means for elevating water to the center thereof and delivering the elevated water into a flume or other conduit by the rotation of the wheel and to have the latter adjustable, so that it may be swung clear of the stream when ice or the injurious effects of high water are present.

A further object of the invention is to provide a water-wheel which may be utilized in transmitting power as well as elevating water for irrigating or other purposes.

A still further object of the invention is to provide a water-wheel with means for elevating water without in the least detracting from the effectiveness of its revolution and to utilize such revolution in conjunction with a particular construction of water-conveyers within the wheel to arrive at the result sought.

The invention consists, essentially, in a water-wheel having peripheral inlets to a series of conduits forming the spokes or intermediate supports of the wheel, all connecting with a central chamber, and a rotatable shaft or axle communicating with said chamber.

The invention further consists in a rotatable water-wheel having peripheral blades and intermediate conduits forming the spokes of the wheel and communicating with a tubular shaft or axle which is rotated by the wheel and also freely adjustable to swing the wheel clear of the water from which the supply is taken.

The invention still further consists of the details of construction and arrangement of the several parts, which will be more fully hereinafter described and claimed.

Figure 1:
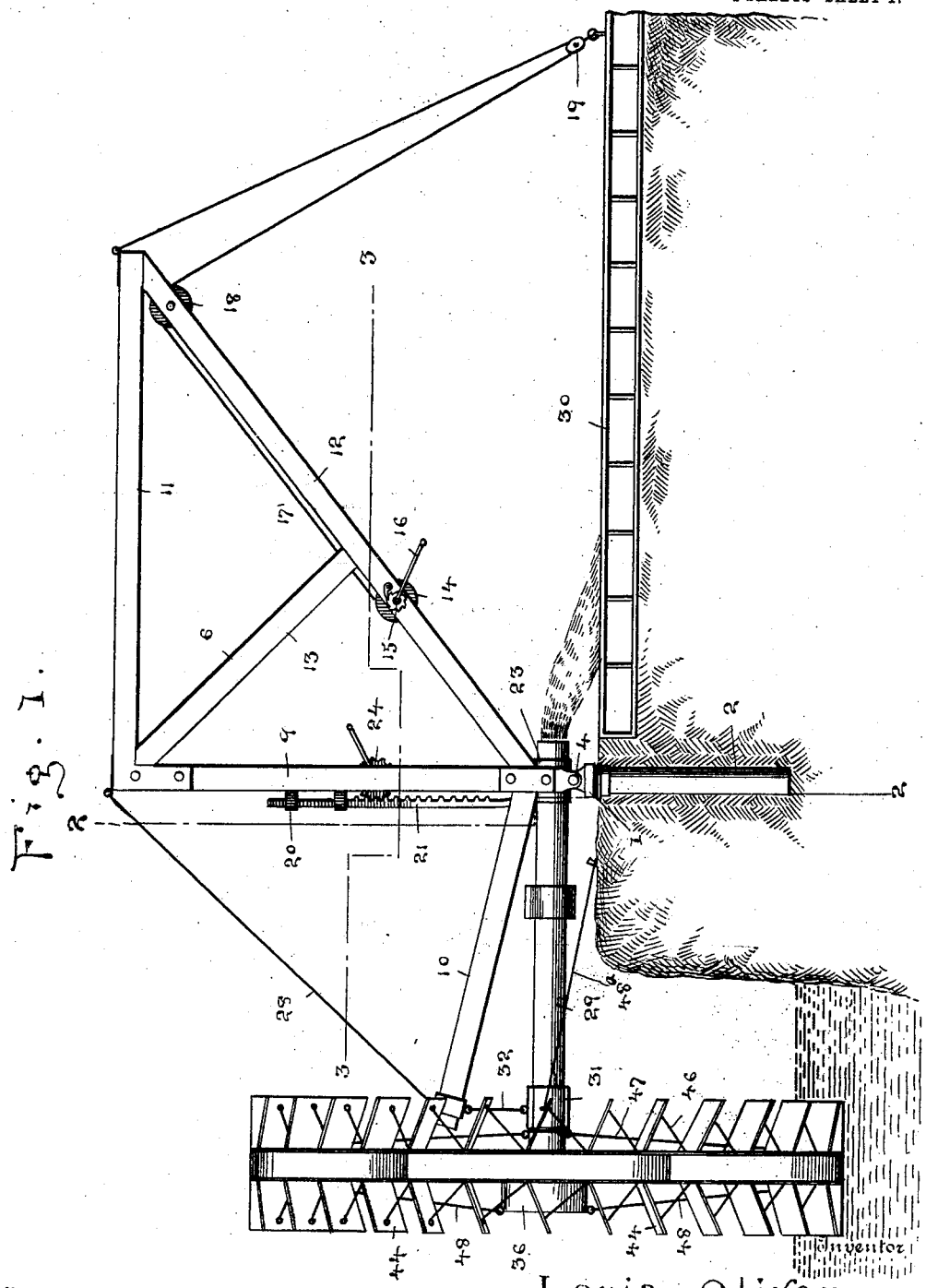
Figure 2:
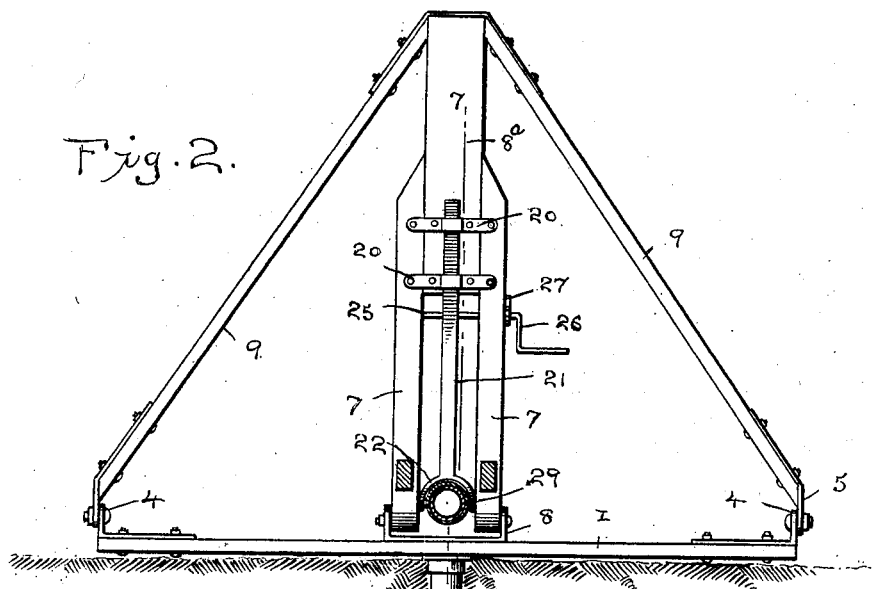
Figure 3:
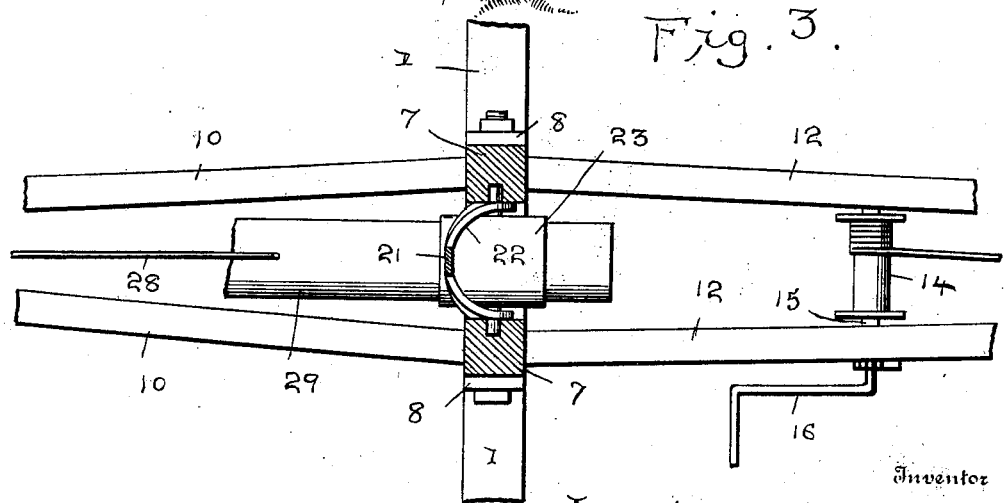

In the drawings, Figure 1 is a side elevation of the elements contributing to the successful operation of the improved wheel, showing the latter in edge elevation and the support for said element in section. Fig. 2 is a section on the line 2 2, Fig. 1. Fig. 3 is a section on the line 3 3, Fig. 1. Fig. 4 is a side elevation of the improved water-wheel, shown broken away in parts. Fig. 5 is a top plan view of a portion of the water-wheel. Fig. 6 is a section on the line 6 6, Fig. 4. Fig. 7 is a section on the line 7 7, Fig. 2.

Similar numerals of reference are employed to indicate corresponding parts in the several views.

The contributing elements and improved wheel are adapted to be supported on the bank of a river or other stream of water or upon a jutting platform erected at a suitable elevation above normal high-water mark.

The reference-numeral 1 designates a base-bar rotatably held on the upper end of a center-post 2 by an elongated bolt or fulcrum-pin connected to the bar 1 and projecting downwardly into the post, as clearly shown by Fig. 7. The center-post 2 is adapted to be embedded in the bank of a river or other stream or erected on a platform, and in some instances it is obvious that the bar 1 might be directly applied to a device analogous to the post 2, secured on a platform. The bar 1 has upwardly-projecting fulcrum-ears 4 at its ends, to which ears 5, secured to the lower terminal of a derrick-frame 6, are pivotally attached. The derrick-frame 6 comprises two center uprights 7, pivotally attached at their lower ends to a fulcrum-plate 8, secured on the center of the bar 1 over the post 2. The upper ends of the uprights 7 are secured to a post 8ª, from which beams 9 extend downwardly in diverging planes and are movably attached through the medium of the ears 5 thereon to the ears 4. Projecting forwardly from the uprights 7 and disposed at an upward angle of inclination are supporting-beams 10, each upright having one of the said latter beams secured thereto. Extending rearwardly from the upper end of the post 8ª are horizontal beams 11, and connected to the rear ends thereof and also to the inner sides of the lower terminals of the uprights 7 are inclined beams 12, which are braced by beams 13, extending therefrom up to the angle of intersection of the beams 11 with the post 8ª. An obvious variation in the structure of the derrick would be to have one beam substituted for the two beams 11. Between the inclined beams 12 a winding-drum 14 is rotatably mounted and held on a shaft 15, having an operating crank-handle 16 and provided with suitable ratchet-and-pawl mechanism to hold the drum against movement under certain conditions, as will be readily understood. A wire cable or analogous device 17 is wound on the drum and passes over a guide-pulley 18, held between the upper extremities of the beams 12, and then extends downwardly through a block or other suitable guide 19, fixed at a point back of the derrick. From the block 19 the cable or analogous device 17 extends upwardly and is attached to the rear-end connecting device for the beams 11, as clearly shown by Fig. 1. By operating the drum 14 in the proper direction the derrick may be thrown inwardly at an angle or be permitted to assume the position shown by Fig. 1.

In guide-strips 20, secured to the upper extremities of the uprights 7 and the lower extremity of the post 8$^a$, the upper end of a rack-bar 21 is slidably mounted, the lower end of said bar being formed with a yoke 22, movably connected to a bearing-sleeve 23. The teeth of the rack-bar 21 are held in continual mesh with a pinion 24, secured on a shaft 25 between the uprights 7, said shaft having a crank-handle 26 and ratchet-and-pawl mechanism 27, whereby the degree of adjustment of the rack-bar may be maintained.

The supporting-beams 10 have guy-cables 28 secured to the outer ends thereof and also to the upper front portion of the derrick, as clearly shown by Fig. 1, the said guy-cables reinforcing the beams 10 and preventing them from being drawn downwardly or displaced by the weight imposed thereon and instituted by devices which will be presently set forth.

Coöperating with the derrick and parts just set forth is a tubular shaft 29, rotatably mounted in the bearing-sleeve 23 and having its inner end disposed in close relation to the outer end of a flume or conduit 30. The outer extremity of the tubular shaft 29 also rotatably extends through a suspending-sleeve 31, connected by a cable or analogous device 32 to the outer ends of the beams 10. The outer end of the shaft extends through and is connected to the tubular hub 33 of a water-wheel 34, and arranged around and in close proximity to the said hub are a series of delivery-spouts 35, which have communication with a central chamber 36 through the medium of outwardly-opening gate-valves 37, there being one valve between each spout and the chamber. The chamber 36 is arranged in concentric relation to the hub 33, and the outer end of the shaft 29 opens directly into the said chamber. Extending from each spout 35 is a spiral conduit 38, having its outer extremity gradually merging into the rim 39 of the wheel, the outer terminals of the conduits in part forming the rim and have their outer ends controlled by gates 40, held in closed and open positions by set-screws or analogous devices 41, the said gates being inclined, as shown by Fig. 4, and the space 42 between each gate and the adjacent part of the succeeding conduit provides a clearance whereby the water may freely pass into the several conduits as the wheel revolves. The conduits 38 form the spokes or intermediate supports for the water-wheel, and to avoid interference with the rotation of the latter and for convenience in adjustment the gates 40 all project inwardly within the confines of the inner periphery of the rim of the wheel. To complete the wheel-rim, side strips 43 are secured thereto and cover the opposite sides of the outer extremities of the conduits, so that the spaces 42 are given a trough-like form. Extending upwardly from the strips 43 are blades 44, having inner angular flanges 45 secured to said strips and brace-rods 46 connected to the outer ends thereof and to the strips, as clearly shown by Fig. 5. The blades 45 are disposed at an angle of inclination, and when the wheel is in position in the water the said blades face the current, so that the wheel will be regularly revolved. The inclination of the blades permits the water impacting thereagainst to push off laterally therefrom to reduce the resistance and rotation of the wheel as much as possible. To render the attachment of the wheel 34 to the shaft 31 positive and insure a rotation of the shaft, the hub 34 is square in contour, and the outer end of the shaft fitted therein is of a like shape. To strengthen the wheel, braces 47 and 48 respectively extend from the inner end of the hub 33 and the outer portion of the chamber 36 to the side strips 43, these braces being omitted in Fig. 4 to avoid confusion, but are clearly shown by Figs. 1 and 6. To hold the wheel steady when let down into the water, a guy-cable 48$^a$ is secured thereto and to a stake or other attaching means on the bank or support for the derrick.

In preparing the wheel to elevate water the gates 40 are opened, and the wheel is then let down into the water, as shown by Fig. 1. The current impacting against the blades 44 rotates the wheel, and water is successively taken up by the conduits, and as the latter rise the water therein flows toward the center of the wheel, forces the gate-valves 37 outwardly, and enters the chamber 36, from whence it passes through the tubular shaft 29 and is emptied into the flume or conduit 30. When the wheel is adapted to be used solely as a power source, a band-wheel or analogous device is applied to the shaft 29, as shown by dotted lines in Fig. 1, and the gates 40 are closed, or the wheel may be used as a power-generating medium and at the same time elevate water. Through the mechanism carried by the derrick and the arrangement of the latter to swivel or turn on the post 2 and also tilt backwardly and forwardly the wheel can be raised from the water at will and swung to one side on the bank or platform when it is not desired to use the apparatus or to prevent injury to the wheel by swiftly-flowing high water carrying debris or ice. By the same means the wheel may be quickly arranged in operative position, and in view of the swivel-mounting of the derrick the wheel may be disposed at any angle to the flume or conduit to obtain the best results in rotating the wheel and elevating the water.

All the parts of the wheel will be of a strong and durable nature and formed of suitable material, and the adjustment thereof may be readily controlled by an operator actuating the drum 14 and the rack-bar 21.

It will be seen that the wheel and contributing elements set forth may be conveniently employed for irrigating purposes or conveying water from a river or other stream any distance inland. It will also be understood that changes in the proportions, dimensions, and minor details of construction may be resorted to without departing from the spirit of the invention.

Having thus fully described the invention, what is claimed as new is—

1. A water-wheel having spiral conduits extending from the center to the periphery thereof, a central chamber into which said conduits are arranged to empty, an angular hub projecting inwardly from the center of the chamber and a rotatable tubular shaft secured to the hub and communicating with the chamber.

2. A water-wheel having elevating-conduits comprised in the structure thereof, a central chamber with which said conduits communicate, a rotatable shaft opening into said chamber and securely fastened to the wheel, the inner end of the shaft being movably supported and also having a swinging movement, and means for raising and lowering the wheel or changing its position without affecting its rotation.

3. A water-wheel having elevating-conduits comprised in the structure thereof, a rotatable shaft secured to the wheel at its inner end, and a swivel-derrick having a tilting adjustment, the inner end of the shaft being held within a portion of the derrick.

4. A water-wheel having a rim, conduits extending from the center thereof to the rim, gates adjustably mounted over the outer ends of the conduits within the rim, said gates being slidably adapted to be held fixedly open or closed, a central chamber with which the conduits communicate, and a tubular shaft opening into the chamber.

5. A water-wheel, comprising a rim, a series of spiral conduits extending from the center of the wheel to the rim and forming intermediate supports for the latter, a chamber at the center of the wheel with which the inner ends of the conduits are adapted to communicate, a securing-hub projecting inwardly from the center of the chamber, and a tubular shaft secured to the said hub and opening into the chamber.

In testimony whereof I affix my signature in presence of two witnesses.

LOUIS OLIVER.

Witnesses:
W. O. UTLEY,
ALBERT CARLSON.